June 24, 1930.  E. WILDHABER  1,767,866
GEARING
Filed Nov. 10, 1927   3 Sheets-Sheet 1

INVENTOR
Ernest Wildhaber

June 24, 1930.  E. WILDHABER  1,767,866
GEARING
Filed Nov. 10, 1927   3 Sheets-Sheet 2

INVENTOR
Ernest Wildhaber

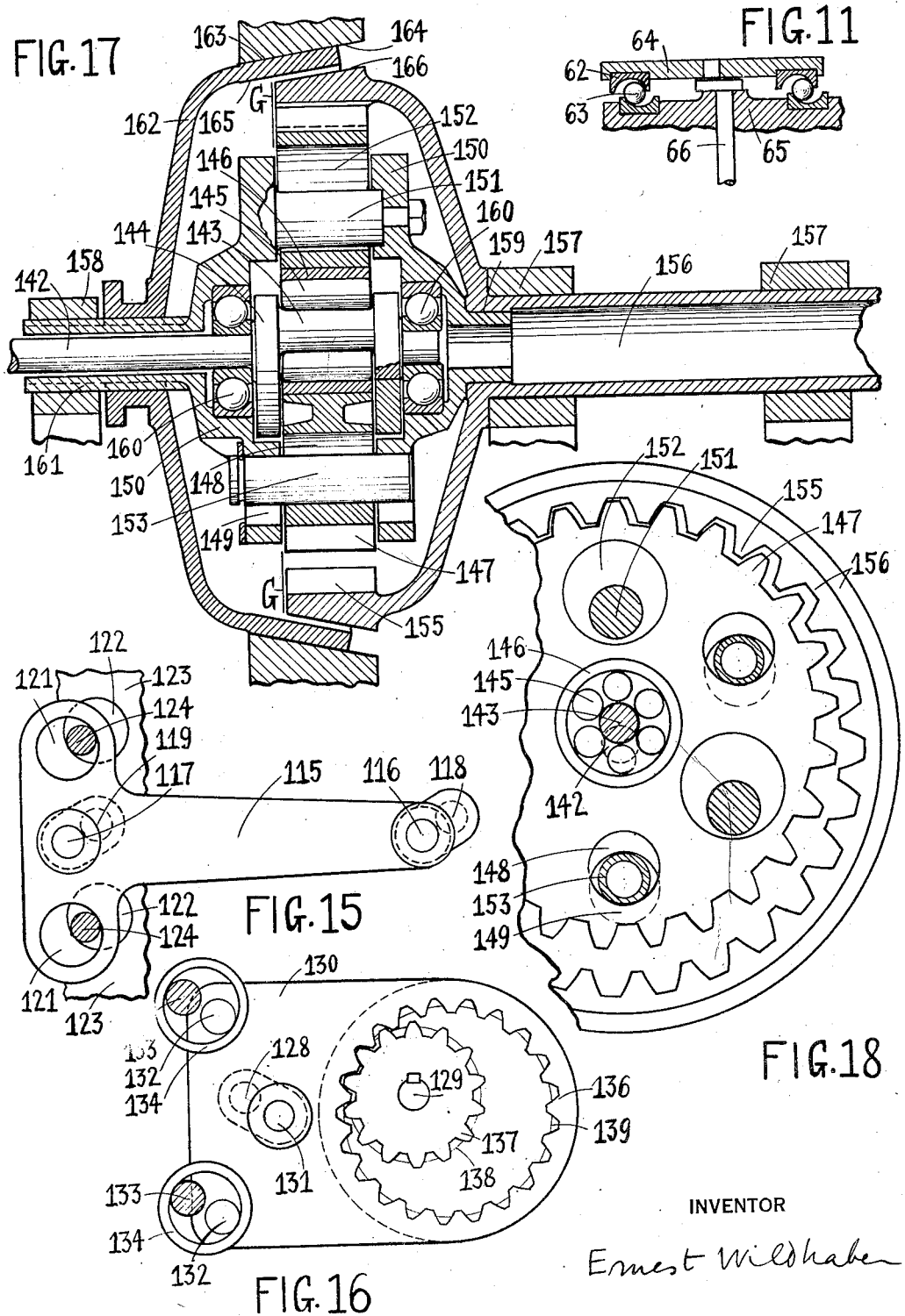

Patented June 24, 1930

1,767,866

UNITED STATES PATENT OFFICE

ERNEST WILDHABER, OF BROOKLYN, NEW YORK

GEARING

Application filed November 10, 1927. Serial No. 232,306.

The present invention relates to gearing for operatively connecting two members, which perform a circular parallel motion with respect to each other. The said motion is sometimes also known under the name of circular translation. Relative motion of this character exists for instance between two members, which turn on offset and parallel axes at the same rate and in the same direction of revolution. Inasmuch as the two members turn at the same rate and in the same direction, no angular motion or turning motion exists relatively between the two members: A straight line of one member having a given inclination angle to a straight line of the other member, will always keep the same inclination angle in all the various relative positions. And if a straight line of one member is parallel to a straight line of the other member, the two lines will always remain parallel.

The present invention is broadly applicable to members performing a circular parallel motion with respect to one another, whether the members turn on fixed centers or whether one center moves around the other, its member performing a planetary motion. If one member is held stationary, the other of said members moves in a circular path while maintaining itself constantly in a parallel position, so that a straight line will assume only parallel positions. Planetary motion of the character considered is known to have many useful applications, one of which is to permit of large reductions with very simple means.

In one known case, a circular parallel planetary motion is effected by rollers, which engage cylindrical holes of one member and turn on pins rigidly secured to the other member of the pair.

One object of the present invention is to do away with the sliding contact and consequent friction loss between rollers and pins, and to provide an arrangement, in which rollers may roll on either of the two members performing a circular parallel motion with respect to one another. A further aim is to provide a simplified construction capable of greater accuracy.

Another object is to provide a gearing for operatively connecting two members performing a circular parallel motion with respect to one another, consisting of antifriction members bodily movable with respect to either of said two members.

A further object of the present invention is to provide suitable applications of my novel gearing.

Other aims will appear in the course of the specification and from reciting the appended claims.

My invention is exemplified in the accompanying drawings, in which

Fig. 11 is an axial section of a planetary member suited to perform a circular parallel motion with respect to a stationary base.

Fig. 15 is a plan view of a development of parallel linkage, as afforded according to my invention.

Fig. 16 is a plan view of a connection by parallel linkage of two shafts turning at different rates.

Fig. 17 is an axial section of a planetary application of my invention to multiple speed gearing.

Fig. 18 is a section along lines G—G of Fig. 17.

Figure 1:
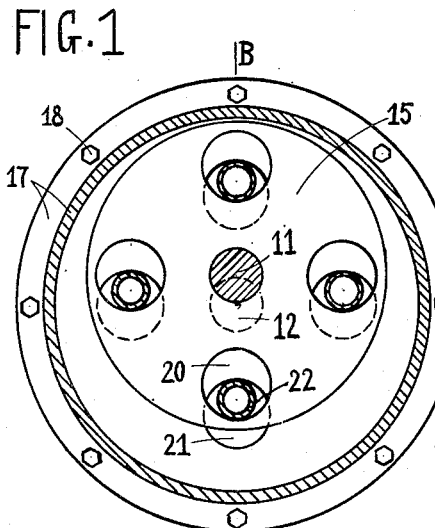
Fig. 1 is a section along lines A—A of Fig. 2, showing two members rotatable on parallel axes at the same rate and in the same direction of revolution, said members being operatively connected in accordance with the present invention.
Figure 2:
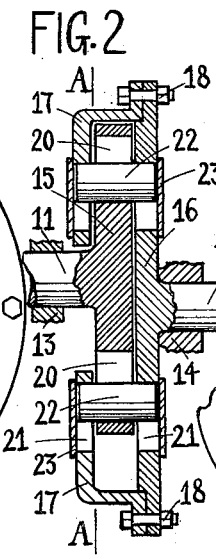
Fig. 2 is a section along lines B—B of Fig. 1.

In Figures 1 and 2, the numerals 11 and 12 denote two shafts which are parallel and offset from one another. The shafts are rotatably held in bearings 13 and in bearings 14 respectively, one bearing 13 and one bearing 14 being shown in Fig. 2. Shaft 11 carries a disk 15 adjacent its end, and shaft 12 carries a disk 16. A circular plate 17 is secured to disk 16, by any suitable means such as bolts 18. Disk 16 and plate 17 partly enclose disk 15. A number of circular holes 20 are provided in disk 15 preferably at an equal distance from its center 11. Corresponding holes 21 are provided in disk 16 and plate 17. The distance of holes 21 from center 12 is the same as the distance of the holes 20 from center 11. The diameter of the holes 20 and 21 is the same and such that the holes 20 and the holes 21 partially overlap. Cylindrical rollers 22 project through the holes 20 as well as through holes 21, at the area, where said holes overlap. When of comparatively large diameter, the rollers are preferably made hollow, as indicated in Fig. 1. Thin disks 23, closing the outside of holes 21, prevent the rollers from falling out of their holes.

When disk 15 turns on center 11, and disk 16 with plate 17 turn by an equal angle about their center 12, then the holes 21 will always remain directly underneath the corresponding holes 20, and the distance of the holes 21 from the corresponding holes 20 will be constant and equal to the offset of centers 11 and 12. The rollers 22 therefore continuously fit their pairs of holes.

Conversely one member, for instance the one rotatable on axis 11, is suited to move the other member with the said rollers in such manner, that the other member turns on its axis exactly by the same angle, as the driving member turns on its own axis. Through the means indicated, the two said members are positively geared up to equal angular velocities and equal directions of revolution.

It will now be shown, that the rollers 22 actually roll in the holes 20 as well as in the holes 21. By applying the known methods of kinematics, the relative motion of one hole (20) with respect to the other hole (21) of a pair is found to be the same, as if the two holes would merely turn on the centers of said holes with equal angular velocity and in the same direction of revolution. The peripheral velocity of the two holes at their points of contact with the roller (22) is therefore equal and oppositely directed. Hence it is obvious that the roller will roll in either hole.

From consideration of the drawings it is also seen, that the rollers move bodily with respect to either member, that is to say relatively to the two members rotatable respectively on the axes 11 and 12.

Figure 3:
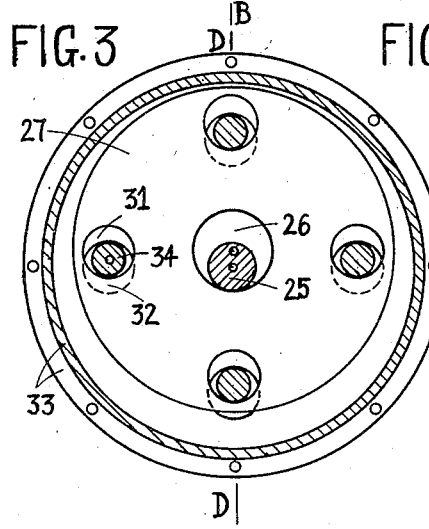
Fig. 3 is a section along lines C—C of Fig. 4, illustrating an application of my invention to planetary motion.
Figure 4:
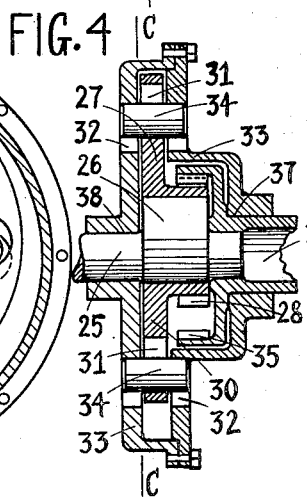
Fig. 4 is a section along lines D—D of Fig. 3.

The Figures 3 and 4 illustrate in application to planetary gears of the principle described with reference to Fig. 1 and Fig. 2. A shaft 25, usually the drive shaft, contains an eccentric 26 or broadly an offset portion disposed parallel to its axis 25. A body 27 is rotatably mounted on the eccentric and contains an external gear 28 and a disk 30 protruding over said external gear. Disk 30 contains a number of circular cylindrical holes 31, and corresponding cylindrical holes 32 are provided on either side of disk 30 in the stationary parts 33. Rollers 34 operatively connect the holes 31 with the holes 32. The external gear 28 meshes with an internal gear 35, which forms part of the driven member 36. The latter is journalled in bearings 37, one of which is shown in Fig. 4, while the shaft 25 is journalled in bearings 38, of which also only one is indicated.

Figure 5:
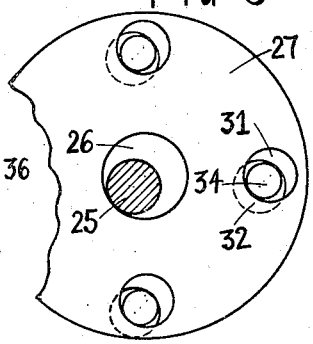
Fig. 5 is a view of the planet member and of adjoining parts of Fig. 3 in a different position as compared with Fig. 3.

The stationary holes 32, rollers 34, and holes 31 maintain body 27 continuously in a parallel position, so that it performs a circular translation or circular parallel motion with respect to the stationary parts 33. The internal gear 35 and the driven member 36 are thereby driven at a slow rate, as compared with the rotation of the shaft 25, and in the same direction of revolution as the latter. Fig. 5 indicates another position of body 27.

Figure 6:
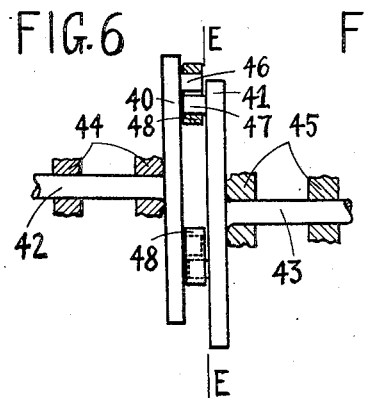
Fig. 6 is a view, partly a section, of a modified embodiment of my gearing.
Figure 7:
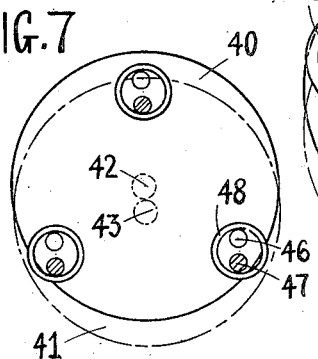
Fig. 7 is a view and a section along lines E—E of Fig. 6.

In the embodiment of my invention indicated in Figures 6 and 7 modified means for operatively connecting the two members 40, 41 are devised. The invention is here shown as applied to the simpler case, in which the members 40, 41 turn on fixed centers; but can be likewise applied to planetary gears. Members 40, 41 contain shafts 42, 43, which are journalled respectively in bearings 44, 45. Pins 46, 47 project from the members 40, 41 respectively and are rigidly connected with said members. The pins take the place of the circular holes of the previously explained embodiments. Rings 48, or hollow cylindrical rollers, internally engage a pin 46 and a pin 47 each. The rings 48 perform the kinematical function of the cylindrical rollers of previous embodiments. Here also it is found, that the rings 48 roll on either of the two members 40, 41, that is to say on their respective pins. The rings 48 also move bodily with respect to either member 40, 41.

The operative connection illustrated in Figures 6 and 7, comprising pins and rollers, is frequently applied where the offset of the two shafts is operatively large. A certain amount of spring cushioning may further be readily introduced, by making the rings thin enough that they slightly deform under load, and thus afford a shock absorption which is difficult to obtain with conventional types of gearing.

Figure 8:
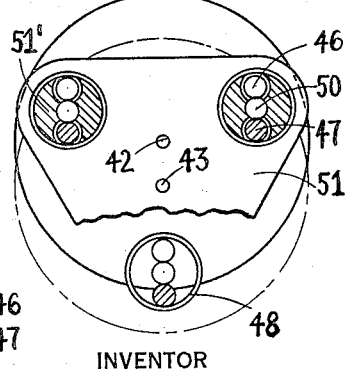
Fig. 8 is a view and partly a section similar to Fig. 7, illustrative of a further slight modification.

In the case of a large offset between the shafts 42, 43, rollers 50 may be provided, which externally engage the pins 46, 47 of the two members, see Fig. 8. A cage 51 is then provided, to maintain rollers 50 in place. The parts 51' of the cage, which hold the rollers 50, are shown in section in Fig. 8 and are shaded. In addition to the rollers 50 rings 48 may also be provided. The lower portion of Fig. 8 shows the structure without the cage.

In all shown embodiments, the rollers, or broadly the anti-friction means provided in accordance with the present invention maintain a constant relation relatively to each other, although they move bodily with respect to either member of the pair connected by said means. A cage holding said rollers or antifriction means in their proper constant relation may therefore be provided in any case, if so desired.

Figure 9:
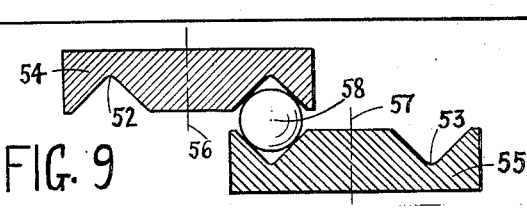
Fig. 9 is a section through a pair of corresponding circular guidances of two members performing a circular parallel motion with respect to one another, and a view of a ball connecting said guidances.

A further type of antifriction means, such as may be used for operatively connecting two members performing a circular parallel motion with respect to each other, is illustrated in Fig. 9. The circular parts, which are cylindrical holes or cylindrical pins in the former examples, are here V-shaped circular grooves 52, 53 provided on pieces 54, 55 to be secured to the two members of a pair. The axes of said circular grooves are indicated at 56, 57 in dash and dot lines. The antifriction member connecting the two grooves is here embodied as a ball 58, which in operation chiefly rolls in the grooves 52, 53.

Figure 10:
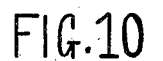
Fig. 10 is a plan view of two members provided with circular guidances, such as shown in section in Fig. 9, in a larger scale, said members being suited to perform a circular parallel motion with respect to one another.

Fig. 10 illustrates a member 60 suited to perform a circular parallel motion with respect to stationary horizontal member 61. Three pairs of grooves 52, 53 are provided in the shown embodiment. The balls 58 have here the double function of effecting the desired operative connection and of supporting member 60, that is to say of constituting a thrust bearing.

For smaller eccentricities or offsets substantially spherical cups 62, see Fig. 11, may be provided for the balls 63. In this figure 64 denotes a member performing a circular parallel motion with respect to stationary table 65, motion being applied to member 64 by means of a crank shaft 66.

Figure 12:
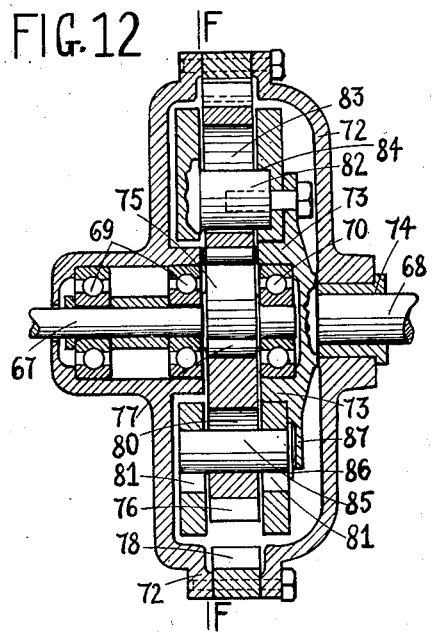
Fig. 12 is an axial section through another planetary embodiment of the present invention.
Figure 13:
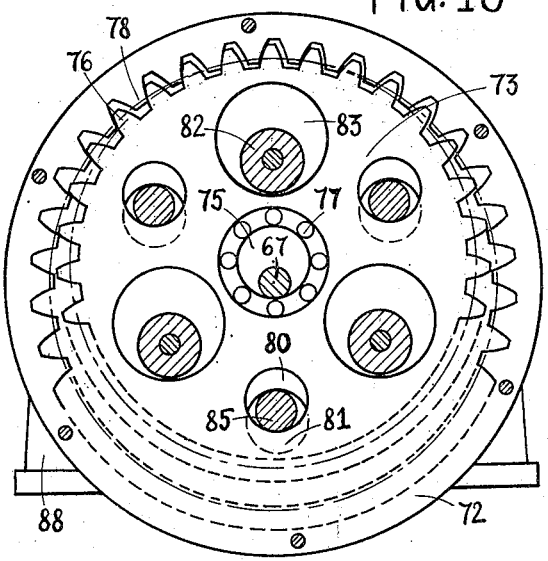
Fig. 13 is a section along lines F—F of Fig. 12.

Planetary embodiments of my invention permit of large ratios with simple means. One such embodiment is indicated in Figures 12 and 13. This as well as other embodiments may be used either for gearing up or for gearing down, that is to say the driven member may be rotated either at a higher or at a lower rate, respectively, than the drive shaft. When using the embodiment of Fig. 12 and Fig. 13 for gearing down, that is to say for speed reduction, 67 denotes the drive shaft and 68 the driven shaft. Drive shaft 67 is journalled in ball bearings 69, 70 provided in stationary member 72 and in the driven member 73, of which shaft 68 forms a part. The latter is rotatably held in stationary bearings 74, one of which is shown in Fig. 12. In reduction gears of this type and of the type illustrated in Fig. 14 large pressures are applied directly to the high speed shaft, on which therefore preferably antifriction bearings are provided, as indicated. The low speed shaft may be journalled in usual sliding type bearings, because the friction loss will be small in any case, on account of the small speed. Shaft 67 contains an eccentric portion 75, on which an external gear 76 is rotatably mounted. Here also preferably antifriction bearings are provided, such as a roller bearing 77. Gear 76 meshes with an internal gear 78, which forms part of the stationary member 72. During rotation of drive shaft 67, gear 76 performs a planetary motion and rolls on the stationary internal gear 78. The rotation of gear 76 is transmitted to the driven member in such manner, that gear 76 performs a circular parallel motion relatively to the driven member 73, with means which are now going to be described and which form part of the present invention.

Gear 76 contains cylindrical holes 80, and the driven member 73 contains corresponding cylindrical holes 81 of equal diameter. Portions of the driven member are disposed on either side of the external gear 76. The two sides of said driven member are held together with cylindrical projections 82 which reach without contact through holes 83 of gear 76 and which are bolted to suitable recesses 84. The driven member may be composed of such a number of parts as is suited for production. In operation it constitutes a solid unit, extending on either side of gear 76 and reaching through said gear. The holes 81 extend through both sides of driven member 73. Rollers 85 are provided, which connect the holes 80 with the holes 81 and which transmit the rotation of gear 76 to the driven member 73. To prevent the rollers from falling out of their holes, the rollers are provided with small heads 86, which on one side lean against the edge of the holes 81, and on the other side are held in place by a projection 87 of member 73.

It is noted that the operative connection between gear 76 and driven member 73 is in principle the same as between the two members of a pair in the previously explained examples.

The stationary members 72, which are in the form of a casing, are provided with projections 88, with which they may be suitably fastened to beams or to a recessed base.

In cases where the diameter of the external gear 76 is nearly equal to the diameter of its mating internal gear 78, difficulty is sometimes experienced through interference of the teeth outside of the regular mesh. It is found that interference may be overcome by increasing the pressure angle of the teeth, and in extreme cases by also shortening the height of the teeth.

Figure 14:
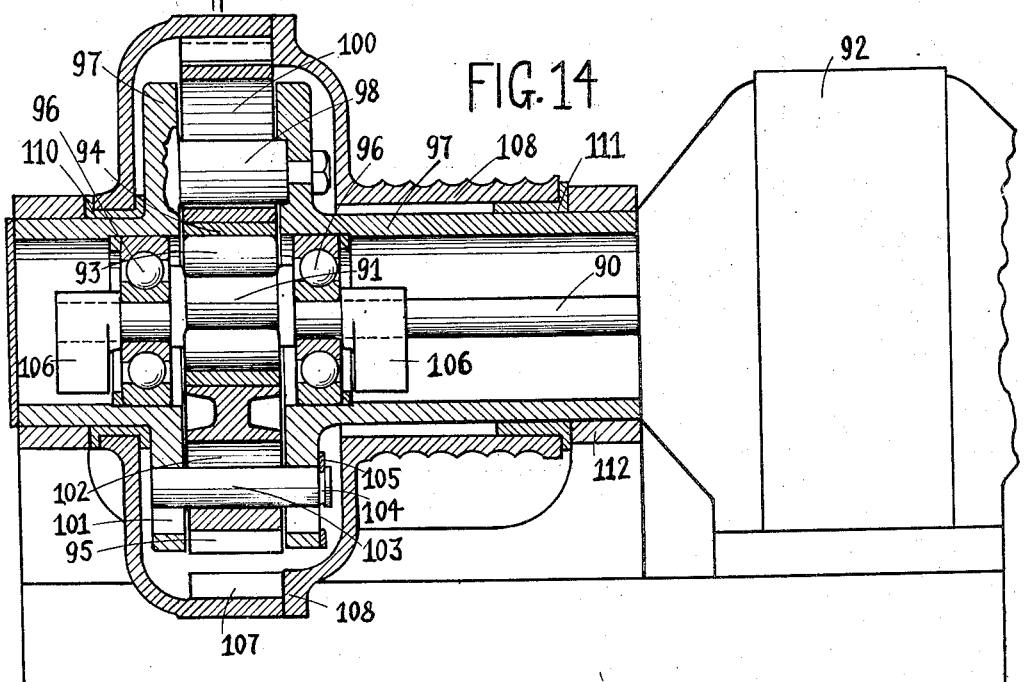
Fig. 14 is an axial section, partly a view, of an application of my invention to hoists.

In the embodiment indicated in Fig. 14, which can be considered as an application to hoists, the numeral 90 denotes a drive shaft provided with a crank 91 and receiving motion in any suitable manner, such as by an electric motor 92. Rollers 93 are provided on crank 91, which roll on a race 94 secured to an external gear 95, and which form a roller bearing for that gear. Crank shaft 90 is journalled adjacent the crank in ball bearings 96, which are held in a stationary member 97. This member is composed of two parts, resembling member 73 of Fig. 12, and reaches with projections 98 through circular holes 100 of external gear 95. It contains circular holes 101, which overlap other circular holes 102 of equal diameter, provided in gear 95. Cylindrical rollers 103 connect the holes 101 and the holes 102, and force the gear 95 to perform a circular parallel motion with respect to the stationary member 97, that is to say a planetary motion with gear 95 remaining always in a parallel position. A groove 104 fits a projection 105 and prevents the rollers from falling out of their holes. Counter weights 106 are provided on the crank shaft 90 for balancing the mechanism, to keep it free from vibration also at high speeds of the shaft 90. Gear 95 meshes with an internal gear 107, which is bolted to a drum 108, and which, together with said drum, constitute the driven member of the mechanism. This driven member is journalled in two bearings 110, 111 on stationary member 97. The latter is rigidly secured to stationary supports 112, which are bolted to beams 113, as is also motor 92. Drum 108 contains a suitable groove extending along a helix and suited to receive a rope, to be used for hoisting. During rotation of shaft 90, drum 108 performs a slow motion in the same direction as shaft 90, thereby winding or unwinding its rope.

On account of the rolling means used in transmitting power from the drive shaft 90 to drum 108, namely of the ball bearings 96, roller bearing 93 and the rollers 103 friction loss is practically eliminated, while simplicity of design is nevertheless maintained.

Fig. 15 diagrammatically illustrates a further adaptation of the present invention. A connecting rod 115 connects crank 116 with crank 117, which are rotatable respectively on fixed centers 118, 119. In most positions, such as for instance in the one illustrated, a connecting rod will establish a positive connection between the two shafts (118, 119). In certain positions, however, namely when the center line of the connecting rod coincides with the connecting line between the two centers 118, 119, the drive between the two shafts is not positive, as well known. To effect a positive drive in all positions, two or more connecting rods would have to be used, whose cranks are angularly displaced with respect to each other. This complication makes this type of positive operative connection unfit for general use. With the present invention, however, it is possible to eliminate the drawback of the simple connecting rod, that is to say to effect a positive operative connection in all positions with a single connecting rod. A number of new fields for this simple type of drive may thereby be created.

Circular holes 121 are provided on projections of the connecting rod 115, and corresponding holes 122 of equal diameter in a stationary part 123. The latter extends on either side of the projections of rod 115. Rollers 124 extend through the holes 121, 122 and operatively connect them, so that rod 115 is maintained in a parallel position. In the above said critical points, the rod 115 will also be maintained in a parallel position through the rollers 124, so that every small motion of one shaft 118, 119 will be immediately transmitted to the other, thereby establishing positive connection. If so desired, more than two pairs of holes may be provided.

Moreover, pins and rings may be provided in place of the holes and rollers, as has been explained with reference to Fig. 6 and Fig. 7.

In the embodiment shown diagrammatically in Fig. 16, two shafts 128, 129 are operatively connected by a member 130, in a manner that the ratio between the two shafts 128, 129 is other than one to one, it being in the particular case illustrated 1 to 2, shaft 128 turning twice per revolution of shaft 129. Member 130 is journalled on crank 131 of shaft 128 and is maintained in parallel position in the following manner:

Member 130 contains pins 132 projecting from its surface, and having a diameter slightly smaller than the eccentricity of crank 131. Other pins 133 of equal diameter project from a stationary member not further indicated, in such manner that the pins 133 are offset from the pins 132 by the eccentricity of the crank 131, on lines drawn parallel to the crank arm, see Fig. 16. Rings 134 connect the pins 132 with the pins 133. The rings are suited to roll on both pins of a pair, and to operate as has been described with reference to Fig. 6 and Fig. 7.

One end of member 130 contains rigidly secured to it an internal gear 136, meshing with an external gear 137, which latter turns on center 129. The offset between center 129 and the center of internal gear 136 equals the eccentricity of crank 131. External gear 137 further carries a disk ground to its pitch circle 138, which during the operation rolls internally on a disk secured to member 130, which disk is internally ground to the pitch circle 139 of internal gear 136. In other words, aside of their teeth, the gears 136 and 137 contain circular disks contacting with each other and embodying the pitch circles of said gears.

Considering any given position of crank 131, the member 130 is continuously held in a parallel position through the rings 134 and the pitch disks 138, 139 and is therefore compelled to perform a circular parallel motion during rotation of crank 131. The internal gear 136 then performs a planetary motion around gear 137, which latter is thereby turned on its axis through its continuous mesh with gear 136.

A further embodiment of my invention is indicated in the Figures 17 and 18. It is an application to multiple speed planetary gearing, in which a planetary member performs a circular parallel motion with respect to another member. One of the multiple speeds is obtained by locking the planetary gear and thereby applying direct drive from the drive shaft to the driven shaft.

Drive shaft 142 contains a crank portion 143 connected with drive shaft 142 through crank arms 144, which are formed to serve as counter weights or to have counter weights attached. Rollers 145 are disposed on the crank and together with outside race 146 constitute a roller bearing for supporting an external gear 147. A suitable cage may be provided for the rollers, if so desired. External gear 147 contains circular holes 148 of the character previously explained; and other circular holes 149 are provided on a member 150, which consists of two parts solidly bolted together and reaching with projections 151 through holes 152 of said external gear. The member 150 is disposed concentric with shaft 142. The circular holes 148 and 149 are operatively connected by rollers 153, which maintain gear 147 in a parallel position with respect to member 150, so that the gear 147 performs a circular parallel motion with respect to said member. Gear 147 meshes with an internal gear 155, which is secured to or is integral with the driven shaft 156. The latter is journalled in two bearings 157. Member 150 is journalled in a stationary bearing 158 and in a bearing 159 provided by the hollow shaft 156. The drive shaft 142 is journalled in two ball bearings 160.

Member 150 contains a splined portion 161, on which is slidably mounted a clutch member 162. When this clutch member has been moved to the position indicated in the drawing, its conical outside surface 163 engages a stationary conical surface 164, and thereby maintains member 150 stationary. The planet 147 then performs a circular parallel motion, and transmits slow motion to the internal gear 155.

When on the other hand the clutch member 162 is moved to the right, its conical surface 165 engages the outside conical surface 166 of internal gear 155, thereby connecting member 150 with the internal gear 155 and locking the planetary gear. The planetary gear then turns around as a whole, the drive shaft 142 and the driven shaft 156 turning at the same speed.

Two speeds in the same direction are obtained in this manner. The two speeds can be made much different or they may be made readily at a ratio of one to two, a result otherwise difficult to obtain in planetary gearing with simple means and good efficiency. In this case the planetary gear 147 should have a pitch radius equal to the eccentricity of the crank 143.

It is understood that my invention is capable of further applications; and that various changes and modifications may be made without departing from its spirit. For definition of its scope it is relied upon the annexed claims.

What I claim is:

1. Gearing comprising a shaft having a portion offset from and parallel to its axis, a member rotatably mounted on said offset portion, a stationary member, circular holes provided in both members, said holes extending parallel to said shaft, and cylindrical rollers internally engaging said holes and suited to roll in the holes of both members.

2. Transmission gear, containing in combination, a shaft having a portion offset from and parallel to its axis, a planetary member mounted on said offset portion, said member being provided with gear teeth, a gear disposed concentric with said shaft and engaging said teeth, a guiding member, means for effecting a circular parallel motion between said guiding member and said planetary member, said means comprising holes provided in both of said members, and rollers of smaller diameter than said holes, said rollers being suited to roll in the holes of both members.

3. Transmission gear, containing in combination, a shaft having a portion offset from and parallel to its axis, a planetary member mounted on said offset portion, said member being provided with teeth forming an external gear, an internal gear disposed concentric with said shaft and engaging said teeth, a guiding member extending on either side of said planetary member, means for effecting a circular parallel motion between said guiding member and said planetary member, said means consisting of circular holes provided in said planetary member, of other circular holes of equal diameter provided in said guiding member and overlapping the first named holes, and of cylindrical rollers extending through both holes.

4. Transmission gear, containing in combination, a driving shaft having a portion offset from and parallel to its axis, a planetary member mounted on said offset portion, said member being provided with teeth forming an external gear, a driven member disposed concentric with said driving member, an internal gear forming part of the driven member and meshing with said teeth, a guiding member suited to remain stationary, and means for effecting a circular parallel motion between said planetary member and said guiding member, said means consisting of circular holes provided in said planetary member, of other circular holes of the same diameter provided in said guiding member, and of rollers suited to roll in the holes of both members.

5. Multiple speed transmission gear, containing in combination, a drive shaft having a portion offset from and parallel to its axis, a planetary member mounted on said offset portion, said member being provided with teeth forming an external gear, an internal gear disposed concentric with said shaft and engaging said teeth, a guiding member disposed concentric with said shaft, rolling elements suited to roll with their outside surfaces on surfaces of revolution provided on said planetary member and on said guiding member, for effecting a circular parallel motion between said planetary member and said guiding member, means for holding a part of the whole transmission gear stationary for effecting a gear reduction, and means for locking the transmission gear, to effect direct drive.

6. Multiple speed transmission gear, containing in combination, a drive shaft having a portion offset from and parallel to its axis, a planetary member mounted on said offset portion, said member being provided with teeth forming an external gear, a driven member disposed concentric with said drive shaft, an internal gear engaging said teeth and forming part of said driven member, a split guiding member disposed concentric with said drive shaft and extending on either side of said planetary member, means for locking the drive shaft with the driven member, means for holding the guiding member stationary, and means for effecting a circular parallel motion between the planetary member and the guiding member, said means consisting of cylindrical holes provided in the planetary member, of other circular holes of the same diameter provided in the guiding member, said other holes overlapping partially the first named holes, and of cylindrical rollers extending through both holes.

7. Transmission gear, containing in combination, a shaft having a portion offset from and parallel to its axis, a planetary member mounted on said offset portion, said planetary member being provided with gear teeth, a gear disposed concentric with said shaft and engaging said teeth, a guiding member, means for effecting a circular parallel motion between said guiding member and said planetary member, said means comprising cylindrical holes provided in both of said members, hollow cylindrical rollers of smaller outside diameter than the diameter of said holes, said rollers extending through the holes of one member and into the holes of the other member and being suited to roll in the holes of both members.

8. Transmission gear, containing in combination, a drive shaft having a portion offset from and parallel to its axis, a planetary member mounted on said offset portion, said member being provided with teeth forming an external gear, an internal gear disposed concentric with said shaft and engaging said teeth, a guiding member, one of said members having portions extending on both sides of the other of said members, means for effecting a circular parallel motion between said guiding member and said planetary member, said means consisting of holes provided in said portions and in said other member, and of rollers of smaller diameter than said holes, said rollers extending through the holes of said other member and into the holes of said portions and being suited to roll in the holes of said other member and of said portions.

9. Gearing for operatively connecting two members performing a circular parallel motion with respect to one another, comprising two members, a shaft having a portion offset from and parallel to its axis, the center line of said shaft being held in constant relationship with respect to one of said two members, the other of said two members being mounted on said offset portion, surfaces of revolution provided on both members, said surfaces having centers offset from and parallel to said shaft, and rolling elements suited to roll with their outside surfaces on said surfaces of revolution of both members.

10. Gearing comprising a shaft having a portion offset from and parallel to its axis, a member rotatably mounted on said offset portion, a stationary member, a plurality of surfaces of revolution disposed on the first said member and on said stationary member, said surfaces having center lines offset from and parallel to said shaft, and rolling elements suited to roll with their outside surfaces on said surfaces of revolution of both members.

11. Gearing comprising a shaft having a portion offset from and parallel to its axis, a planetary member mounted on said offset portion, said member being provided with gear teeth, a gear engaging said teeth, a stationary member, a plurality of surfaces of revolution disposed on said planetary member and on said stationary member, said surfaces having center lines offset from and parallel to said shaft, and rolling elements suited to roll with their outside surfaces on said surfaces of revolution of both members.

ERNEST WILDHABER.